Aug. 26, 1969   E. W. RADTKE   3,463,390
PNEUMATIC AIR TEMPERATURE CONTROL FOR AIRCRAFT CABINS
Filed Jan. 23, 1968   6 Sheets-Sheet 1

FIG. 1
PRIOR ART

INVENTOR.
EDWARD W. RADTKE
BY
AGENT

United States Patent Office 3,463,390
Patented Aug. 26, 1969

3,463,390
PNEUMATIC AIR TEMPERATURE CONTROL FOR AIRCRAFT CABINS
Edward William Radtke, Bloomfield, Conn., assignor to United Aircraft Corporation, East Hartford, Conn., a corporation of Delaware
Filed Jan. 23, 1968, Ser. No. 699,865
Int. Cl. G05d *11/16, 23/13;* F15c *3/14*
U.S. Cl. 236—13                                   9 Claims

ABSTRACT OF THE DISCLOSURE

Means are provided for maintaining an artificial ambient pressure surrounding the variable area orifice of a pneumatic temperature control system (which heretofore exhausted to a widely varying low pressure sink) such that the ratio of the pressure of the source of servo fluid and the artificial ambient pressure is substantially constant.

BACKGROUND OF THE INVENTION

Field of the invention

This invention relates to temperature control systems and particularly to pneumatic control systems for controlling the temperature of a fluid in a duct.

Description of the prior art

Figure 1:
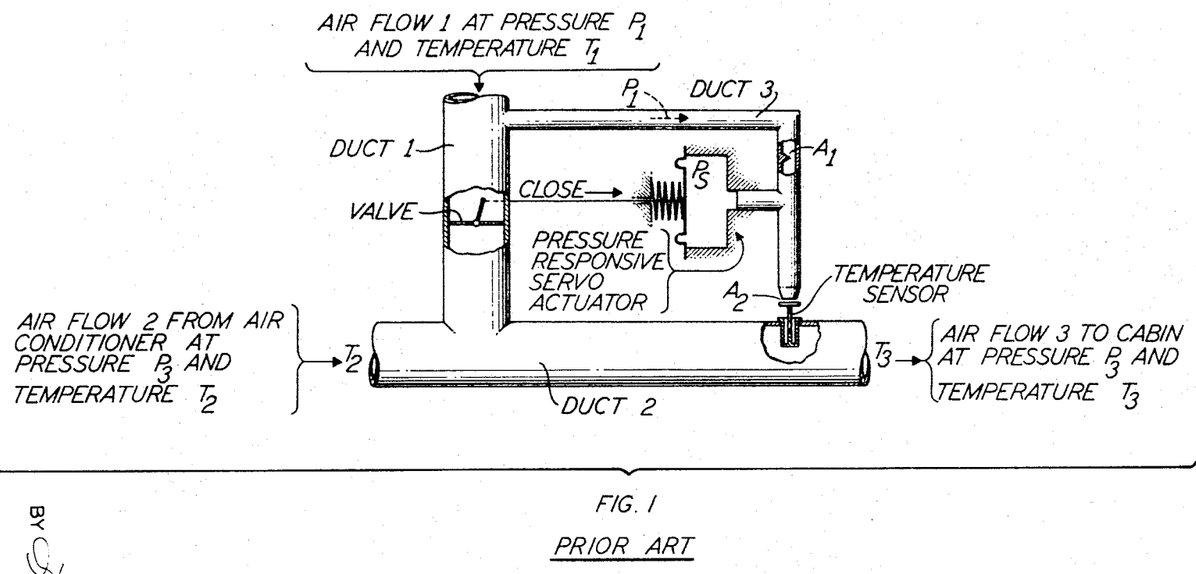
FIG. 1 is a schematic illustration of a pneumatic temperature control system known in the art.

FIG. 1 depicts a typical state-of-the-art pneumatic temperature control system for use with an aircraft air conditioning system, for example. It is seen that air at temperature $T_1$ is mixed with air at temperature $T_2$ to obtain air at temperature $T_3$ for the cabin of the airplane. The valve in duct 1 is modulated by a pressure responsive servo actuator of any common type. It is seen that the servo pressure $P_s$ which provides the force for modulating the valve is dependent upon supply pressure $P_1$, low pressure sink pressure $P_a$ (which may be ambient pressure, for example) and variable area $A_2$, which, in turn, is dependent upon the temperature $T_3$ sensed by the temperature sensor whose case expands with an increase in temperature $T_3$, increasing variable area $A_2$ and vice-versa. Thus it is obvious that the pressure responsive servo actuator will respond to variations in pressure $P_1$ and variations in the ambient pressure $P_a$. The supply fluid, flow 1, is generally obtained by bleeding from the power plant of the airplane and, therefore, the flow and pressure $P_1$ are dependent on the r.p.m. level of the power plant. Thus pressure $P_1$ will vary with engine throttle settings, e.g., take-off, cruise and idle. Pressure $P_a$ varies with aircraft altitude. These variations are undesirable because they introduce errors in the sense that they affect the modulation of the valve, whereas the desirable situation is to have the valve modulate only in response to a change in variable area $A_2$ which is a function only of the temperature $T_3$ which it is desired to control. The above-mentioned errors cause excessively wide temperature control bands as shown in FIG. 2.

Figure 2:
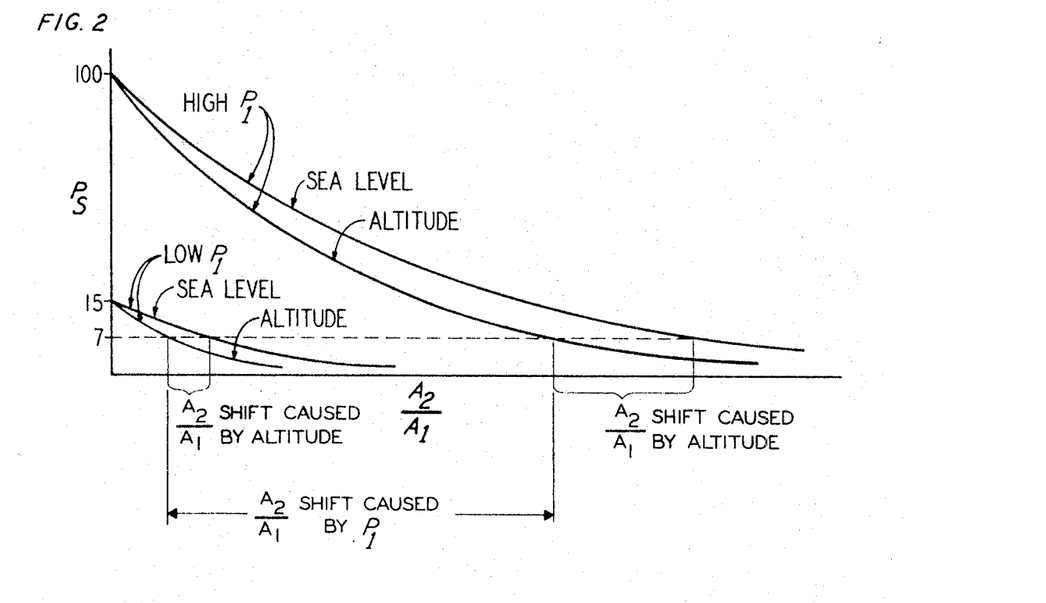
FIG. 2 is a graphical illustration showing servo pressure $Ps$ variation with changes in the ratio of variable area $A_2$ and fixed area $A_1$ for four different conditions: curve 1 represents $Ps$ when $P_1$ is maximum and $Pa$ is sea level ambient pressure; curve 2 represents $Ps$ when $P_1$ is maximum and $Pa$ is ambient pressure at an altitude (30,000 ft., for example); curve 3 represents $Ps$ when $P_1$ is minimum and $Pa$ is ambient pressure at an altitude (30,000 ft., for example).

In FIG. 2 there are shown four curves which define:

(1) Ambient pressure $Pa$ at sea level with supply pressure $P_1$ at its maximum (this occurs when an aircraft engine is at full throttle, such as on take-off, for example);
(2) Ambient pressure $Pa$ at altitude (30,000 ft. for example) with supply pressure $P_1$ at its maximum;
(3) Ambient pressure $Pa$ at sea level with supply pressure $P_1$ at its minimum (this occurs when an aircraft engine is at idle as, for example, on landing); and
(4) Ambient pressure $Pa$ at altitude with supply pressure $P_1$ at its minimum (engine idle 30,000 ft. for example.)

While the servo pressure $Ps$ varies over a narrow band during valve modulation, the effects of the ambient pressure and supply pressure changes can be seen from FIG. 2 by assuming the servo pressure to be a constant at 7 p.s.i. for instance. It can be seen that the value of $A_2/A_1$ required to hold 7 p.s.i. in the actuator varies as the altitude varies, even though the supply pressure $P_1$ is constant. It can also be seen that the value of $A_2/A_1$ required to hold 7 p.s.i. in the actuator changes as the supply pressure $P_1$ varies. Since $A_2$ is a function of the duct temperature $T_3$, it can be seen that these changes in value of $A_2/A_1$ require corresponding changes in the duct temperature. These duct temperature changes represent a shift in the set point of the temperature sensor 4 and are thus undesirable.

Figure 3:
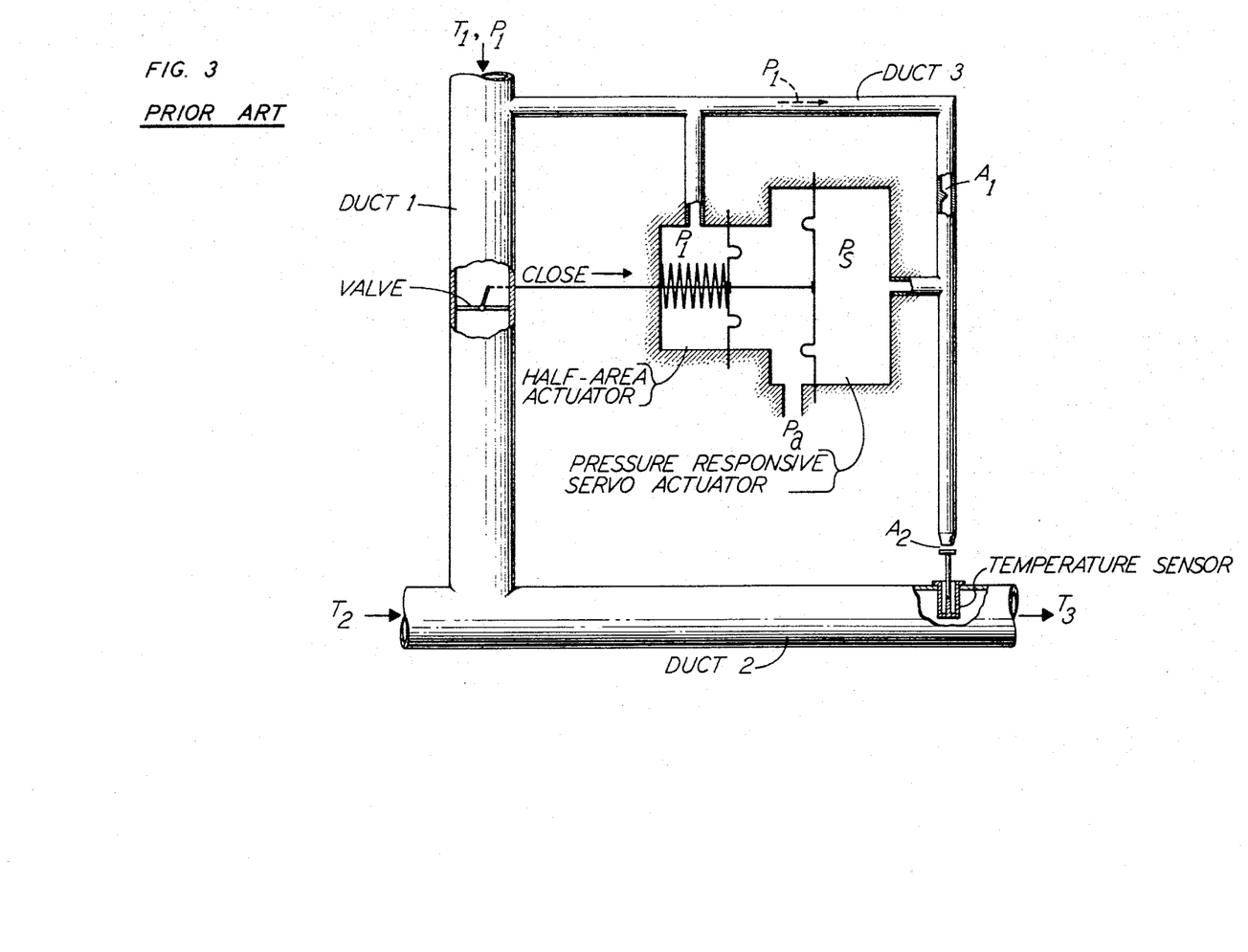
FIG. 3 is a schematic illustration of a pneumatic control system known in the art.
Figure 4:
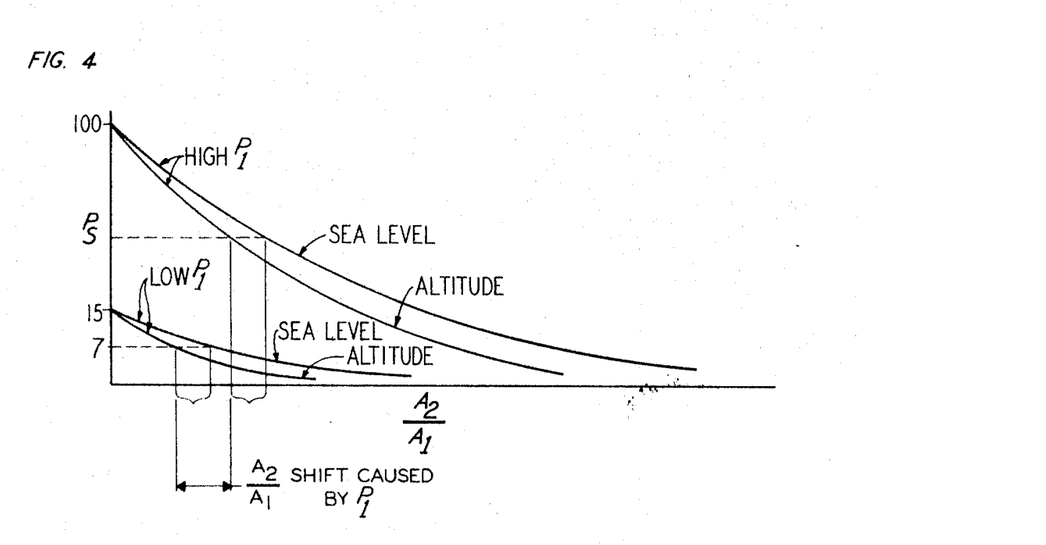
FIG. 4 is a graphical illustration showing servo pressure $Ps$ variation with changes in the radio of variable area $A_2$ and fixed area $A_1$ after the addition of the "half-area" actuator.

It is possible to reduce this shift in the set point through the use of a "half-area" actuator in which the servo pressure $Ps$ in the actuator chamber is balanced by inlet pressure $P_1$ acting in a secondary chamber having an area approximately half the area of the main actuator chamber as shown in FIG. 3. With this type of actuator the servo pressure will be approximately half the inlet pressure instead of a relatively constant value, thus minimizing the $A_2/A_1$ shift, as shown in FIG. 4.

While electronic temperature controls have been devised which are more accurate than the above-described pneumatic temperature control, their high cost makes them relatively undesirable. However, I have found a way to improve the accuracy of the pneumatic temperature control systems by reducing the affect of ambient pressure $Pa$ variation due to changes in altitude.

SUMMARY OF THE INVENTION

An object of the present invention is to provide an improved pneumatic temperature control system which is more accurate than pneumatic temperature control systems known heretofore.

A further object of the invention is to provide a pneumatic temperature control system in which the effect of varying low pressure sink pressures, due to variations in altitude, is greatly reduced.

In accordance with the present invention, an increased accuracy pneumatic temperature control system, in which the effect of varying low pressure sink pressure is greatly reduced, is provided by the addition of means for maintaining an artificial ambient pressure $P_2$ surrounding the variable area $A_2$ such that the ratio of the pressure $P_1$ of the source of servo fluid and the artificial ambient pressure $P_2$ is substantially constant. By so maintaining the artificial ambient pressure $P_2$, servo actuator pressure $Ps$ remains substantially a constant percentage of the pressure $P_1$ of the source of servo fluid regardless of low pressure sink pressure $Pa$ variation so that variations in the area $A_2$ are minimized and, therefore, the temperature shift is minimized.

In accordance with a further aspect of the present invention, it may be desireable, in certain cases, to maintain the gage pressure ratio constant rather than the absolute pressure ratio; therefore, it is also my invention to maintain the ratio of the pressure $P_1$ of the source of servo minus low pressure sink pressure to artificial ambient pressure minus low pressure sink pressure a constant $$\left(\frac{P_1-P_a}{P_2-P_a}\right)=\text{constant}$$

such that the servo actuator pressure $Ps$ remains substantially a constant percentage of the pressure of the source of servo fluid $P_1$, regardless of the low pressure sink pressure $Pa$ variation.

The foregoing and other objects, features and advantages of the present invention will become more apparent in the light of the following detailed description of preferred embodiments thereof, as are illustrated in the accompanying drawings.

DESCRIPTION OF THE PREFERRED EMBODIMENT

Figure 5:
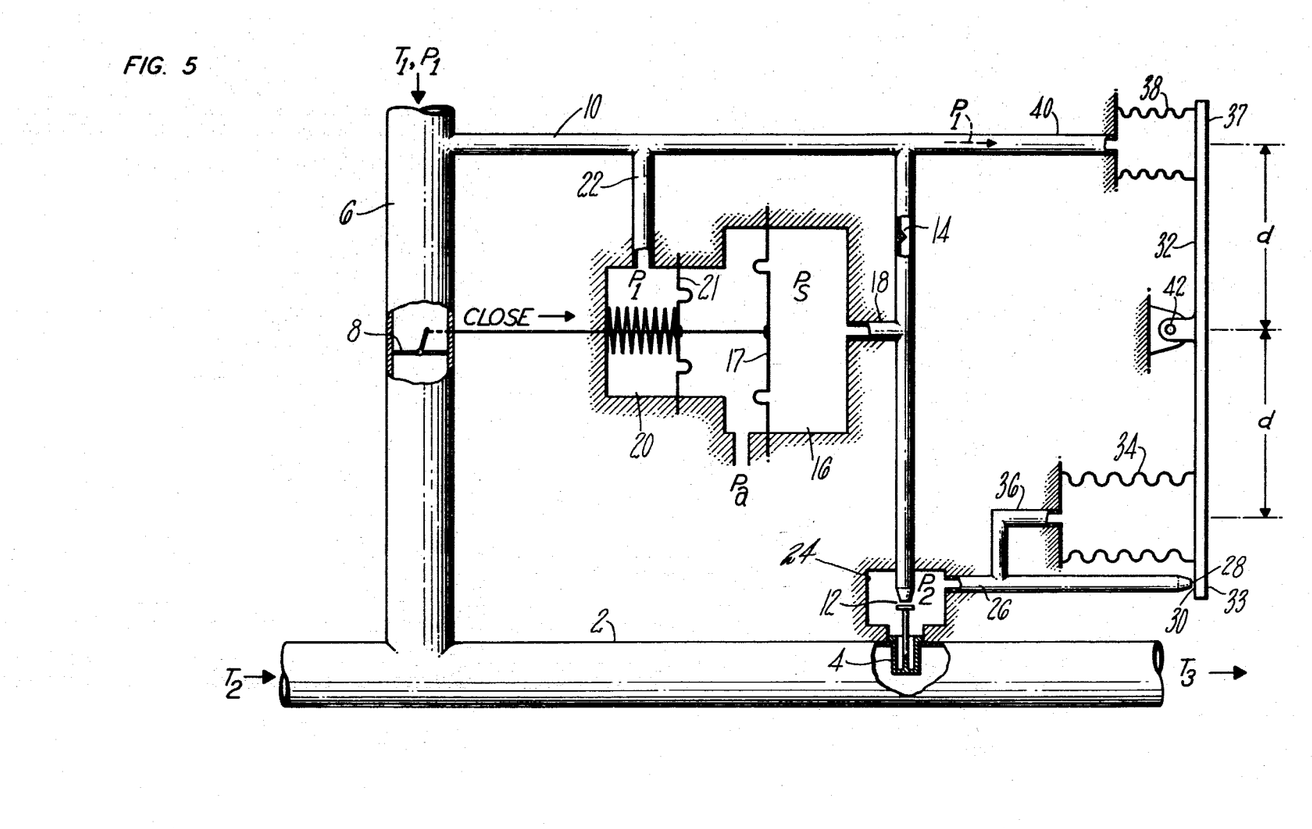
FIG. 5 is a schematic drawing of an exemplary embodiment of a pneumatic temperature control system in accordance with the present invention.

Referring now to FIG. 5, a first duct 2 connects a first source of fluid under pressure (not shown), which may be, for example, the outlet of an air conditioning system, to an aircraft cabin (not shown). A temperature sensor-transducer 4 is disposed in the first duct 2; the temperature sensor-transducer 4 may be any of those well known in the art, such as a bimetal type. A second duct 6 connects the first duct 2 with a second source of fluid under pressure (not shown). The second source of fluid may be at a higher temperature than the first source of fluid so that by mixing the two fluids in the proper amounts, a fluid of proper temperature will be admitted to, for example, an aircraft cabin. A valve 8, which may be of the butterfly type, is disposed in the second duct 6 for regulating the flow of fluid therethrough. A third duct 10 connects a source of servo fluid, which may be, for example, the second source of fluid, with a variable area orifice 12, the area of which orifice is varied by movement of the temperature sensor-transducer 4. Disposed in the third duct 10, is a fixed area orifice 14. A pressure responsive servo actuator 16 is provided for modulating the valve 8 and has a diaphragm 17 which is responsive to the pressure in the third duct 10 at a point between the variable area orifice 12 and the fixed area orifice 14; a line 18 connects the servo actuator 16 to the third duct 10 for that purpose. An auxiliary pressure responsive servo actuator 20, which may be any one of several types known in the art such as a fixed area type having an area a percent of area 17 and a spring, a variable pressure responsive type having a pressure responsive surface area 21 which is a fixed percentage of the surface area 17 of servo actuator 16, or a variable area type having a pressure responsive surface area 21 which is nominally a fixed percentage of the surface area 17 of servo actuator 16 but which increases in area as the servo actuator 16 opens valve 8, is provided for modulating the valve 8. The auxiliary servo actuator 20 is responsive to the pressure of the second source, $P_1$, and for convenience, actuator 20 is shown connected via line 22 to the third duct 10, which in turn is connected to the second source of fluid. All of the above is old and constitutes no part of my inventive concept. The portion of the temperature control system as shown in FIG. 5 which forms my invention is the following: Chamber 24 is provided surrounding the variable area orifice 12 in which an artificial ambient pressure, $P_2$, may be maintained. The chamber 24 has variable outlet means 26 including an orifice 28. The orifice 28 is adapted to form, with end 30 of a pivotally mounted element 32, valve means indicated generally by numeral 33. Adjacent end 30 of pivotally mounted element 32 is a pressure responsive force producing means 34 which may take the form, for example of a bellows and which is responsive to the artificial ambient pressure $P_2$ in its interior, and which is responsive to the true ambient pressure $Pa$ on its exterior surface area; the interior of the bellows 34 is connected to the outlet means 26 via line 36. At the other end 37 of the pivotally mounted element 32 there is disposed a second pressure responsive force producing member 38, which is also shown, for exemplary purposes, as a bellows. Bellows 38 is responsive to the pressure of the second source of fluid $P_1$ to which its interior is connected via line 40, and responsive to the low pressure sink pressure $Pa$ (which is shown for an example to be ambient pressure) on its exterior surface area. Bellows 38 has a smaller surface area (on which the pressures to which it responds act) that the corresponding surface area of bellows 34 for purposes explained hereinafter. Bellows 34 and bellows 38 are each shown as being located distance $d$ from pivot 42 for ease of computation.

The operation of the improved accuracy pneumatic temperature control system is as follows:

The gage pressure ratio of the supply fluid pressure $P_1$ and the artificial ambient pressure $P_2$ is maintained substantially constant by the valve means 33 which may be a flapper valve as shown, a spool valve, or any other type of metering valve known in the art. If the artificial ambient pressure $P_2$ increases, bellows 34 will expand and push end 30 away from the orifice 28, and the trtificial ambient pressure $P_2$ will decrease so that the gage pressure ratio of $P_1/P_2$ is constant. The ratio of the pressures is determined by the ratio of the areas of the two bellows. The torque which bellows 34 exerts on pivotally mounted element 32 is seen to be:

$$(P_2-Pa)A_{34} \times d$$

wherein $P_2$ = the artificial ambient pressure
$Pa$ = the true ambient pressure
$A_{34}$ = the pressure responsive area of bellows 34
$d$ = the distance bellows 34 is located from pivot 42.

The force exerted on element 32 by bellows 38 is:

$$(P_1-Pa)A_{38} \times d$$

where $P_1$ = the second source of fluid (supply) pressure
$A_{38}$ = the pressure responsive area of bellows 38
$d$ = the distance bellows 38 is located from pivot 42.

In order for equilibrium to exist the forces must be equal; therefore:

$$(P_2-Pa)A_{34} \times d = (P_1-Pa)A_{38} \times d$$

Rearranging tnd cancelling like terms results in the following equation:

$$\frac{P_1-P_a}{P_2-P_a} = \frac{A_{34}}{A_{38}}$$

Alternatively, the bellows can be of equal area, but located different distances from the pivot 42 so that if the bellows are of equal area, $$(P_2-Pa)A \times d_{34} = (P_1-Pa)A d_{38}$$

$$\frac{P_1-P_a}{P_2-P_a} = \frac{d_{34}}{d_{38}}$$

It should also be noted that the two methods above-mentioned could be combined and also that the two bellows could both be located at the same end of lever 32 on opposite sides thereof.

The following are four typical conditions existant during the flight of an aircraft, based on $$\frac{A_{34}}{A_{38}}=5$$

| Case | Altitude | Throttle setting | $P_1$ (p.s.i.a.) | Pa (p.s.i.a.) | $P_2$ (p.s.i.a.) | $P_1/P_2$ |
|---|---|---|---|---|---|---|
| I | Sea level | Full | 250 | 15 | 62 | 4.05 |
| II | do | Idle | 38 | 15 | 19.6 | 1.94 |
| III | 60,000 ft | Full | 25 | 1 | 5.8 | 4.3 |
| IV | 60,000 ft | Idle | 15 | 1 | 3.8 | 3.95 |

Except for case II, an area ratio of 5 to 1 produces a substantially constant 4 to 1 $P_1/P_2$ ratio over the range of operating conditions. It is obvious that this is a vast improvement over the $P_1/P_2$ ratio which would exist if my control concept is not utilized. The ratio would vary between 2.5 and 25 without my control, as can be seen from the above table.

Figure 6:
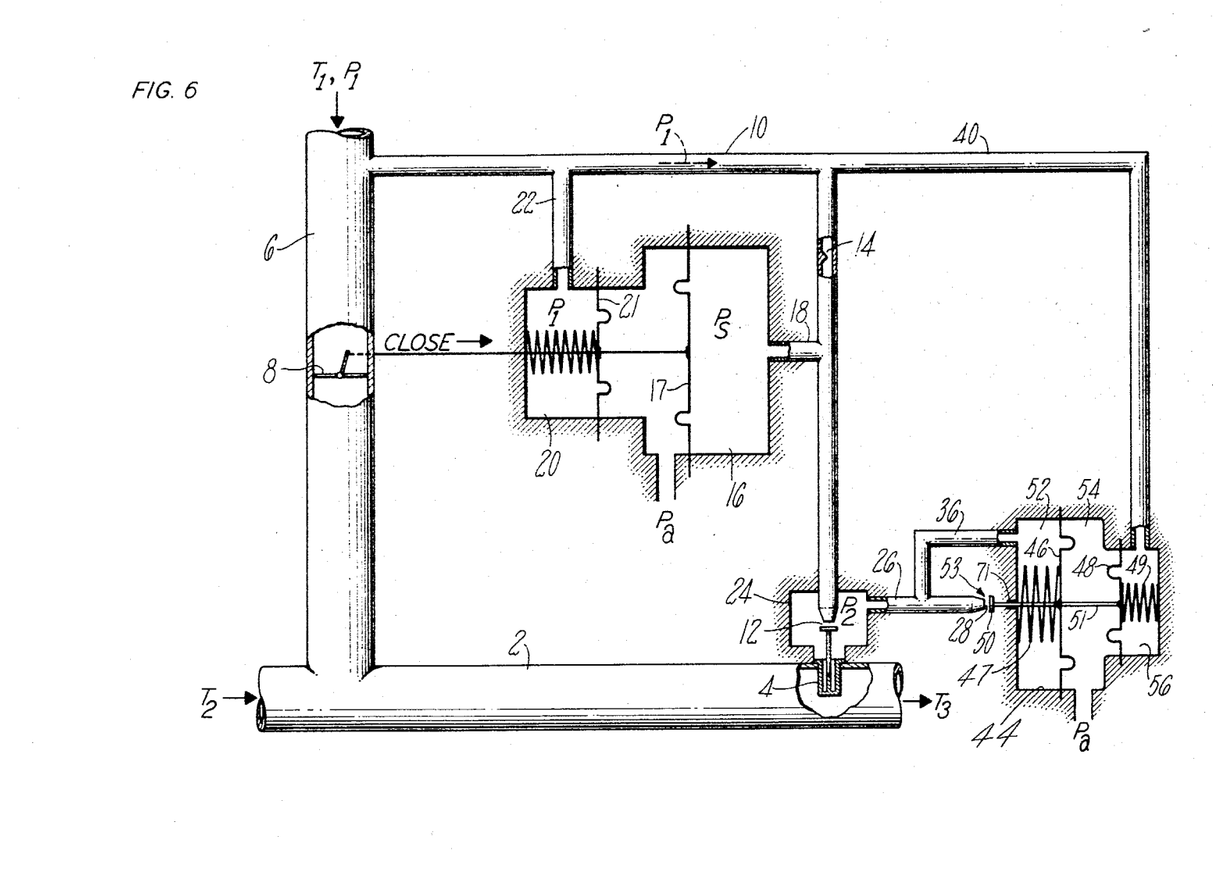
FIG. 6 is a schematic drawing of another embodiment of a pneumatic temperature control system in accordance with the present invention.

FIG. 6 shows an embodiment similar to that shown in FIG. 5 except that a diaphragm arrangement is substituted for the bellows-pivotally mounted element arrangement. In the figures, like numerals refer to like elements. Its operation is identical. Housing 44 contains two diaphragms, 46 and 48 and two springs 47 and 49. A valve element 50 is fixed to the diaphragms 46 and 48 via rod 51 for movement therewith; rod 51 passes through a transfer gland 71 in the wall of chamber 52. Valve element 50, in cooperation with orifice 28, form valve means 53. The diaphragms divide housing 44 into 3 chambers: chamber 52 is exposed to pressure $P_2$; chamber 54 is exposed to the true ambient pressure Pa; and chamber 56 is exposed to pressure $P_1$. The valve element 50 moves with diaphragms 46 and 48, which move in response to changes in the above-mentioned pressures thereby varying the area of the orifice 28 in order to control pressure $P_2$ to that the ratio of $P_1/P_2$ is substantially constant.

Figure 7:
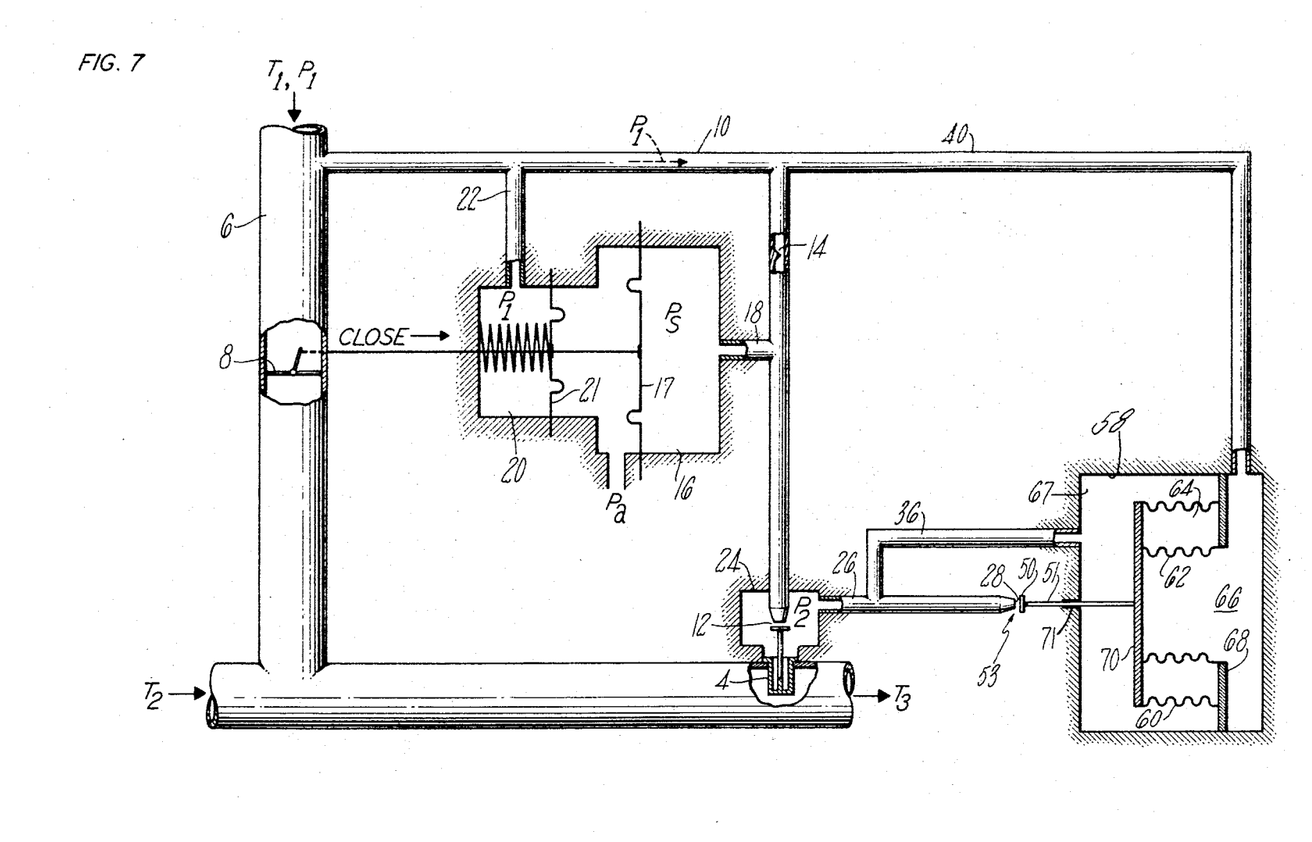
FIG. 7 is a schematic drawing of still another pneumatic temperature control system embodying my invention.

Referring now to FIG. 7 there is shown an embodiment of my invention which utilizes evacuated bellows. A housing 58 contains bellows 60 and 62 supported from the housing by a first wall member 68. A second wall member 70 closes the opposite end of the bellows assembly. Bellows 62 is disposed within bellows 60 and spaced therefrom for forming with wall members 68 and 70 a chamber 64 which is evacuated. The assembly of 60, 62, 68 and 70 divides the housing 58 into two chambers 66 and 67. Valve inlet pressure $P_1$ is admitted to chamber 66, while pressure $P_2$ is admitted to chamber 67. Valve element 50 outside of housing 58 is attached to the wall means 70 by a rod 51 passing through a feed-through gland 71 for movement with the wall member 70 in response to changes in pressure $P_1$ and $P_2$. All other elements in FIG. 7 are the same as those in FIG. 6.

In the configuration shown in FIG. 7 the following equation describes the relationship between pressure $P_1$ and pressure $P_2$:

$$P_2A_2=P_1A_1$$

where $A_2$=the effective area of bellows 60
$A_1$=the effective area of bellows 62

Therefore, it is obvious that $$\frac{P_1}{P_2}=\frac{A_2}{A_1}$$

which is equal to a constant K. This configuration is the most accurate, as shown in the following example of four typical cases of conditions existant during the flight of an aircraft.

Letting K–2.5 by sizing the area $A_2$ to be 2.5 times the area $A_1$:

| Case | Altitude | Throttle setting | $P_1$ (p.s.i.) | Pa, p.s.i. | $P_2$ (p.s.i.) | $P_1/P_2$ |
|---|---|---|---|---|---|---|
| I | Sea level | Full | 250 | 15 | 100 | 2.5 |
| II | do | Idle | 38 | 15 | 15.2 | 2.5 |
| III | 60,000 ft | Full | 25 | 1 | 10 | 2.5 |
| IV | 60,000 ft | Idle | 15 | 1 | 6 | 2.5 |

Thus it is seen that a ratio of $P_1/P_2$ can be maintained constant for all four cases.

There has thus been described a preferred embodiment of a pneumatic temperature control system in accordance with my invention. It should be understood by those skilled in the art that various changes and omissions in the form and detail thereof may be made therein without departing from the spirit and scope of the invention, which is to be limited only as set forth in the following claims:

What I claim as new and desire to secure by Letters Patent of the United States is:

1. In combination with a pneumatic temperature control system for controlling the temperature of a fluid flowing through a duct of the type wherein a first duct is connected to a first source of fluid under pressure and a second duct interconnects a second source of fluid under pressure with the first duct, the second source of fluid having a temperature different from the first source of fluid; wherein a valve is disposed in the second duct for regulating the flow of fluid therethrough, the valve being modulated by a pressure responsive servo actuator which is responsive to the pressure in a third duct interconnecting a source of servo fluid with a variable area orifice discharging to a widely varying low pressure sink; and wherein a temperature sensor-transducer is disposed within said first duct downstream of the interconnection of the first and second ducts for varying the area of the variable area orifice in response to changes in temperature of the fluid sensed thereby, the improved comprising:

means for maintaining an artificial ambient pressure surrounding the variable area orifice such that the ratio of the pressure of said source of servo fluid and the artificial ambient pressure is substantially constant.

2. A temperature control system as recited in claim 1, wherein said means for maintaining said artificial ambient pressure comprises:

a chamber in which said artificial ambient pressure is maintained surrounding said variable orifice, said chamber having variable outlet means;

first pressure responsive force producing means responsive to the pressure of said source of servo fluid and to the pressure of said low pressure sink;

second pressure responsive force producing means responsive to the pressure within said chamber and to the pressure of said low pressure sink; and valve means disposed for motion in response to the forces produced by said first and second pressure responsive force producing means so that the movement of said valve means regulates the area of said variable outlet means whereby the artificial ambient pressure is maintained such that the ratio of the pressure of the source of servo fluid and the artificial ambient pressure is substantially constant.

3. A temperature control system as recited in claim 1, wherein said means for maintaining said artificial ambient pressure comprises:
a pivotally mounted member;
first pressure responsive force producing means disposed for applying a force to said pivotally mounted member which is indicative of the difference between the pressure of said source of servo fluid and the pressure of said low pressure sink;
a chamber in which the artificial ambient pressure is maintained surrounding said variable orifice, said chamber having variable outlet means for forming, with said pivotally mounted element, valve means for regulating the pressure in said chamber; and
second pressure responsive force producing means disposed for applying a force to said pivotally mounted member which is indicative of the difference between the pressure within said chamber and the pressure of said low pressure sink, said second pressure responsive force producing means having an area $A_2$ and being located a distance $d_2$ from the pivot of said pivotally mounted member such that the expression $$\frac{P_1 - P_a}{P_2 - P_a} \approx \frac{A_2 d_2}{A_1 d_1} = K$$

where K is greater than 1 and where $P_1$ = pressure of the source of servo fluid;
$A_1$ = the area of said first pressure responsive;
K = a constant; force producing means upon which the pressures to which it is responsive act;
$d_1$ = the distance from the pivot at which said first pressure responsive force producing means exerts its force on said pivotally mounted member;
$P_2$ = the artificial ambient pressure in said chamber;
$A_2$ = the area of said second pressure responsive force producing means uopn which the pressures to which it is responsive act;
$d_2$ = the distance from the pivot at which said second pressure responsive force producing means exerts its force on said pivotally mounted member; and
$P_a$ = the pressure of the low pressure sink.

4. A temperature control system as recited in claim 3, wherein said distance $d_1$ is equal to said distance $d_2$, and area $A_2$ is greater than said area $A_1$.

5. A temperature control system as recited in claim 3, wherein said distance $d_2$ is greater than said distance $d_1$, and said area $A_1$ is equal to said area $A_2$.

6. A temperature control system as recited in claim 1, wherein said means for maintaining said artificial ambient pressure comprises:
a chamber in which an artificial ambient pressure is maintained surrounding said variable orifice, said chamber having variable outlet means;
pressure responsive force producing means having a valve element disposed thereon for forming, with said variable outlet means, valve means; said prespressure responsive force producing means being responsive to the pressure of said source of servo fluid and responsive to the artificial ambient pressure such that the valve element moves in response to changes in the pressure of said servo source and the artificial ambient pressure to regulate the variable outlet means and thereby to maintain the ratio of the pressure of said source of servo fluid and the artificial ambient pressure constant.

7. A temperature control system as recited in claim 5, wherein said pressure responsive force producing means further comprises:
a housing;
a first bellows disposed in said housing;
a second bellows disposed radially inwardly of said first bellows and spaced therefrom for forming an evacuated chamber between said first and second bellows and for forming a second chamber within said second bellows;
first wall means attached to said housing and to one end of said first and second bellows so that said evacuated chamber is sealed at that end, so that the bellows are fixed with respect to said housing at that end and so that said second chamber is open;
second wall means attached to the other ends of said first and second bellows so that said evacuated chamber and said second chamber are sealed at said other end;
said valve element disposed on said second wall means for operation in conjunction with said variable outlet means;
inlet means in said housing for exposing the exterior of said first bellows to the artificial ambient pressure and
inlet means in said housing for exposing said second chamber to the pressure of said source of servo fluid whereby said valve element moves in response to changes in the artificial ambient pressure and the pressure of said source of servo fluid thereby varying said variable outlet means and maintaining the ratio of the pressure of said source of servo fluid and the artificial ambient pressure constant.

8. Apparatus in an aircraft environmental control system for controlling the temperature of a fluid flowing through a duct, comprising:
a first duct connected to a first source of fluid under pressure;
a second duct connecting a second source of fluid under pressure with said first duct, said second source of fluid being at a temperature different from the fluid in said first source;
valve means disposed in said second duct for regulating the flow of fluid therethrough;
temperature sensing means disposed in said first duct downstream of the interconnection of said first and said second ducts, including means for generating a signal indicative of the temperature therein;
a third duct connecting said second source of fluid under pressure with a variable area orifice, said variable area orifice varying in response to a signal from said temperature sensing means;
a fixed area orifice disposed in said third duct;
a pressure responsive servo actuator for modulating said valve, said servo actuator responding to the pressure in said third duct between said fixed area orifice and said variable area orifice;
means for maintaining an artificial ambient pressure region surrounding said variable area orifice such that the ratio of the pressure of said second source of fluid and the artificial ambient pressure is substantially constant.

9. A temperature control system as recited in claim 1, wherein said means for maintaining said artificial ambient pressure comprises:
a chamber in which an artificial ambient pressure is maintained surrounding said variable orifice, said chamber having variable outlet means adapted to vary in response to the movement of a valve element;
a housing;
two spaced pressure responsive force producing means dividing said housing into three chambers, one of said pressure responsive force producing means having a larger pressure responsive surface area than the second of said pressure responsive force producing means;
first inlet means in said housing for exposing the chamber defined by said larger area pressure responsive force producing means and a wall of said housing to the artificial ambient pressure;
second inlet means in said housing for exposing the chamber defined by said smaller area pressure responsive force producing means and a wall of said housing to the pressure of said source of servo fluid;
third inlet means in said housing for exposing the chamber defined by said smaller area pressure responsive force producing means and said smaller pressure responsive force producing means to the pressure of said low pressure sink;
a valve element connected to both said larger and said smaller pressure responsive force producing means for movement therewith and adapted to vary said variable outlet means so that as said valve element moves in response to changes in the artificial ambient pressure, the pressure of said source of servo fluid and the pressure of said low pressure sink, the area of said variable outlet means is varied whereby the ratio of the pressure of said source of servo fluid and the artificial ambient pressure is maintained substantially constant.

References Cited

UNITED STATES PATENTS

| | | | |
|---|---|---|---|
| 2,858,075 | 10/1958 | Le May et al. | 236—13 |
| 2,914,076 | 11/1959 | Zimmerli | 137—82 |
| 2,966,308 | 12/1960 | Jensen | 236—13 X |
| 3,002,692 | 10/1961 | Williams | 236—82 |
| 3,366,332 | 1/1968 | Wells | 236—82 |

WILLIAM E. WAYNER, Primary Examiner

U.S. Cl. X.R.

137—81; 236—80

UNITED STATES PATENT OFFICE
CERTIFICATE OF CORRECTION

Patent No. 3,463,390            October 15, 196

Edward William Radtke

It is certified that error appears in the above identified patent and that said Letters Patent are hereby corrected as shown below:

Column 6, line 58, "improved" should read -- improvement --. Column 7, line 57, before "area $A_2$" insert -- said --.

Signed and sealed this 20th day of January 1970.

(SEAL)
Attest:

Edward M. Fletcher, Jr.           WILLIAM E. SCHUYLER,
Attesting Officer           Commissioner of Pate